United States Patent [19]
Esker et al.

[11] Patent Number: 5,946,773
[45] Date of Patent: Sep. 7, 1999

[54] FOOD PRODUCT HANDLE

[75] Inventors: James H. Esker, San Diego; Gaetano J. Irrera, Carlsbad, both of Calif.

[73] Assignee: Chromium Graphics, Carlsbad, Calif.

[21] Appl. No.: 08/987,304

[22] Filed: Dec. 9, 1997

[51] Int. Cl.⁶ ................................................. A47B 95/02
[52] U.S. Cl. ...................... 16/110 R; 16/111 R; 426/134
[58] Field of Search ............... 16/110 R, 111 R, 16/114 R; 493/943; 426/134, 87; D1/102, 105

[56] References Cited

U.S. PATENT DOCUMENTS

| | | | |
|---|---|---|---|
| D. 114,752 | 5/1939 | Laurentis | D1/102 |
| D. 192,225 | 2/1962 | Coleman | D1/102 |
| D. 222,323 | 10/1971 | Defee | D1/102 |
| D. 334,273 | 3/1993 | Kupperman | D1/102 |
| 1,694,847 | 12/1928 | Donaldson . | |
| 1,867,314 | 7/1932 | Gurwick . | |
| 2,084,026 | 6/1937 | Gurwick . | |
| 2,235,791 | 3/1941 | Wohlers . | |
| 2,255,887 | 9/1941 | Katz | 426/134 |
| 2,857,908 | 10/1958 | Cornfield | 426/134 |
| 3,748,778 | 7/1973 | Ellies et al. | 426/134 |
| 3,751,319 | 8/1973 | Green et al. . | |
| 3,867,927 | 2/1975 | Hergott | 426/134 |
| 4,597,210 | 7/1986 | Kitrell . | |
| 4,933,218 | 6/1990 | Longobardi . | |
| 4,971,646 | 11/1990 | Schell et al. . | |
| 4,978,593 | 12/1990 | Yin et al. . | |
| 5,042,860 | 8/1991 | Bouton | D1/105 |
| 5,132,148 | 7/1992 | Reafler . | |
| 5,223,357 | 6/1993 | Lovison . | |

*Primary Examiner*—Chuck Y. Mah
*Attorney, Agent, or Firm*—Nydegger & Associates

[57] ABSTRACT

A device for holding a frozen food product includes a handle which is formed with a gripper. The gripper is formed with at least one irregularity which conforms with the frozen food product to hold the frozen food product on the handle. Specifically for a substantially flat, elongated handle, the gripper can be indentations into the edge of the handle, a hole through the handle, or a combination of these irregularities. Additionally, the device includes a multi-color design which is affixed to the handle by a four-color process, and a protective layer which is made of a bio-compatible material that is attached to the handle to position the design between the handle and the protective layer. The device is die-cut from a sheet in an operation which simultaneously manufactures a plurality of the devices.

20 Claims, 1 Drawing Sheet

U.S. Patent     Sep. 7, 1999     5,946,773
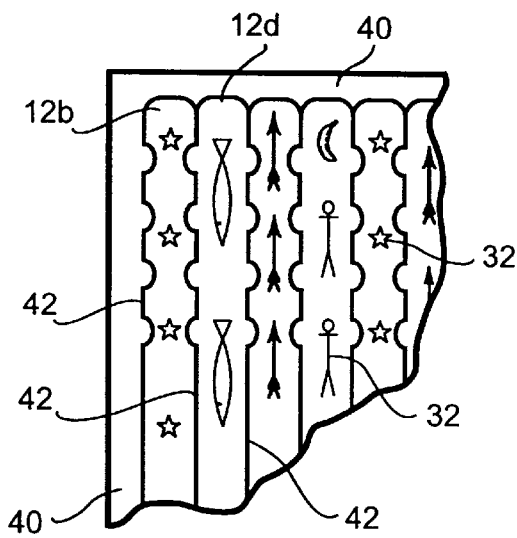
Figure 6
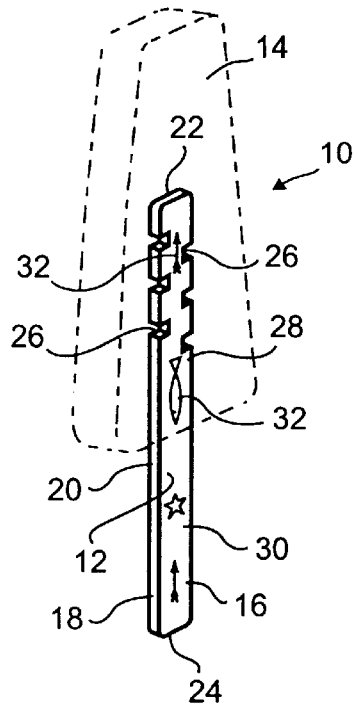
Figure 1
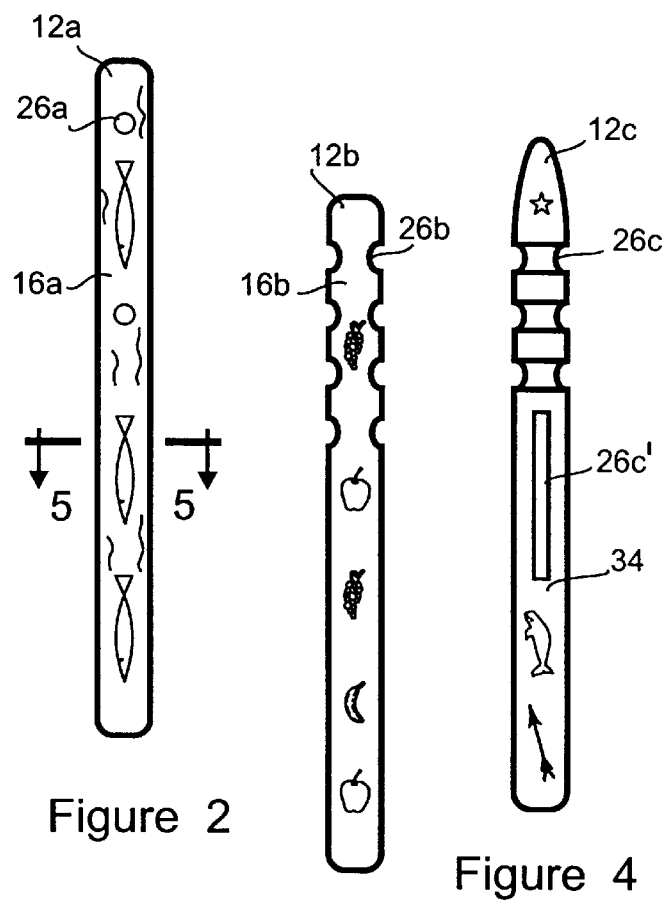
Figure 2
Figure 3
Figure 4
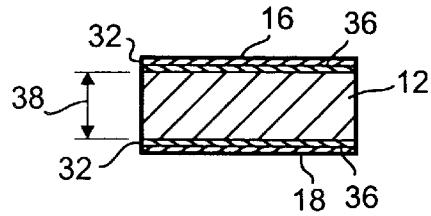
Figure 5

FOOD PRODUCT HANDLE

FIELD OF THE INVENTION

The present invention pertains generally to handles which are useful for carrying objects. More particularly, the present invention pertains to eating utensils which can be incorporated for use with packaged food products. The present invention is particularly, but not exclusively, useful as a popsicle stick.

BACKGROUND OF THE INVENTION

The commercial success of many marketable products depends primarily, if not exclusively, on their value as a utilitarian item. On the other hand, the value of many products is dependent only on the attractiveness of the product, or the interest that it holds for the consumer. Many products, of course, have utilitarian value and are interesting or attractive to the consumer. There are, however, products which are of proven utilitarian value but which are not considered valuable either for their attractiveness or because they are interesting. In this light, consider the popsicle stick.

An ordinary everyday popsicle stick is typically an elongated flat piece of wood which has rounded ends. In most instances, the wood has a somewhat roughhewn texture. This roughness, or semi-roughness, is useful insofar as it is intended to give the popsicle stick a texture that helps adhere frozen food products to the stick. In use, it is typical for a portion of the stick to be embedded into the food product. The remaining portion of the stick then extends outwardly from the food product to provide a handle for the consumer. This handle is useful, as such, while the food product is being eaten. After use, however, the popsicle stick is just another short little stick which has no uniqueness or attractiveness to speak of. Accordingly, the used popsicle stick is normally discarded. In some cases, however, the stick is sucked or chewed, for whatever reason, until it breaks or splinters. The danger here is that the resultant splinters and sharp pointed edges of the destroyed popsicle stick can cause unintentional or unwanted injury to the consumer. In any event, the value of the popsicle stick is effectively nonexistent.

While the above discussion has focused on a popsicle stick, it is to be understood that other types of food products may also use stick handles and, thus, have similar characteristics. Specifically, any type food product which is served on a stick can be considered. For example, a hot dog on a stick is now a popular commercial food product, as are corn on the cob and candy suckers. In all cases, the residue after the food product is eaten is an essentially worthless stick.

In light of the above, it is an object of the present invention to provide a device which is effective for supporting a food product while providing a handle for the consumer as the food product is eaten. Another object of the present invention is to provide a device for supporting a food product which is attractive, and which has value as a collectable or tradable item, after the food product has been consumed and its utility as a food product support has ended. Still another object of the present invention is to provide a device which is not easily destroyed or changed into an object that is potentially dangerous and harmful to the user or to others. Yet another object of the present invention is to provide a device for holding a food product which is simple to use, relatively easy to manufacture, and comparatively cost effective.

SUMMARY OF THE PREFERRED EMBODIMENTS

A device for holding a food product includes a stick-like support structure which is partially embedded into the food product. The portion of the support structure that is embedded in the food product is referred to as a gripper, and is configured with a plurality of irregularities which interactively conform with the food product. Due to the interaction of the gripper's irregularities with the food product, the food product is held and stabilized on the support structure while it is being eaten by the consumer. The remaining portion of the support structure, i.e. the portion which is not embedded into the food product, extends outwardly from the food product and is referred to as the handle. As the name implies, the handle is provided so that the consumer can manipulate the food product without actually having to hold the food product.

As intended for the present invention, the support structure is generally straight and elongated. It may have rounded ends. Further, the support structure is substantially flat to establish opposed surfaces. The surfaces of the support structure are generally smooth and they define an edge which extends around the support structure between the surfaces. As for the irregularities mentioned above, they can be either indentations into the edge of the support surface, protrusions from the edge of the support surface, holes which extend through the support structure from one surface to the other, or a combination of any of these.

In addition to the support structure, the device of the present invention includes a multi-color design which is affixed to a surface, or surfaces, of the support structure. Preferably the design is printed onto the surface in a four color process, well known in the pertinent art, and is composed of biocompatible inks. The particular design to be used is a matter of choice, but it is preferably an eye-catching, attractive and entertaining visual presentation. This is so because, as intended for the present invention, after being used for its primary purpose of supporting a food product, the device may be suitable for use as a collectible or tradable item.

To provide additional protection for the consumer during their use and enjoyment of the device, the device also includes a protective layer which is attached to the support structure. Specifically, the protective layer is attached with the multi-color design positioned between the support structure and the protective layer. In one embodiment of the present invention, the protective layer is clear. In other embodiments, the protective layer can be tinted. In either case, the design should be visible through the protective layer, and the protective layer should be made of a biocompatible material, such as a plastic.

In the manufacture of the device of the present invention, a substantially flat substrate is provided which is, preferably, made of styrene. Eventually, a plurality of support structures are to be die cut from this substrate. Before the die cutting operation, however, a plurality of multi-color designs are first affixed to the substrate. Preferably, this is done by a four color process, as mentioned above. As will be appreciated from earlier disclosure, each multi-color design generally corresponds to a particular support structure. Finally, a stratum of a clear plastic material is attached to the substrate to position the multi-color designs between the substrate and the clear plastic stratum. The resultant sheet, so formed, is then die cut to simultaneously manufacture a plurality of the devices. Food products are then engaged with the device and, together, they can be packaged for commercial sale.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 1 is a perspective view of the device of the present invention shown engaged with a food product, the food product being shown in phantom for clarity;

FIG. 2 is a front elevation view of an embodiment of the present invention;

FIG. 3 is a front elevation view of another embodiment of the present invention;

FIG. 4 is a front elevation view of yet another embodiment of the present invention;

FIG. 5 is a cross sectional view of the device as seen along the line 5—5 in FIG. 2; and FIG. 6 is a top plan view of a sheet that has been prepared for die cutting a plurality of devices therefrom.

DESCRIPTION OF THE PREFERRED EMBODIMENT

Referring initially to FIG. 1, a device for holding a food product in accordance with the present invention is shown and is generally designated 10. In FIG. 1 it will be seen that the device 10 includes a support structure 12, a portion of which is embedded into the food product 14. For purposes of the present invention, the food product 14 can be any type of edible substance which lends itself to engagement with a stick, such as a hot dog, a corn on the cob, a caramel apple or a piece of candy. Preferably, however, the food product 14 is a frozen food product such as an ice cream bar or a popsicle. As will be appreciated by the skilled artisan, a freezable food product 14 can be positioned with the device 10 before the food product 14 has been frozen. Consequently, when the food product 14 is subsequently frozen it will conform with the particular shape used for the device 10.

Still referring to FIG. 1 it will be seen that, for one embodiment of the device 10, the support structure 12 is generally straight and flat, and is elongated with a front (first) surface 16 and a rear (second) surface 18. As shown in FIG. 1, the surfaces 16 and 18 are opposed to each other to create or define an edge 20 therebetween. As shown, this edge 20 extends completely around the support structure 12. Additionally, the support structure 12 has an end 22 and an end 24.

In FIG. 1 it will also be seen that the portion of support structure 12 which is near end 22, and which is embedded into the food product 14, is formed with a plurality of irregularities 26. This portion of the support structure 12 is referred to herein as the gripper 28. The remaining portion of the support structure 12, i.e., the portion which is not formed with any irregularities 26, which is external to the food product 14 and which extends therefrom, is referred to herein as the handle 30. Specifically, for the embodiment of device 10 shown in FIG. 1, the irregularities 26 on gripper 28 are notches or indentations which have been formed into the edge 20 of the support structure 12. As contemplated for the present invention, the irregularities 26 can be of many different shapes. For example, the irregularities 26a for the embodiment of device 10 shown in FIG. 2 are holes which have been formed into the support structure 12 between the surface 16a and its opposed surface 18a (not shown). As another example, for the device 10 shown in FIG. 3, the irregularities 26b are recesses which are aligned along the edge 20.

Returning back to FIG. 1, it will be seen that an additional component of the device 10 is a design 32. As shown, a design 32 is affixed to the surface 16. It is to be appreciated, however, though not seen, a design 32 can also be affixed to the opposed surface 18. As disclosed here, the design 32 includes fish, stars, arrows, stick figures, and various fruits. Many other presentations can, of course, be used. Preferably, the designs 32 are made by a four color process, or by any other process well known in the pertinent art. No limitation on the type of process that is used to affix the design 32 to support structure 12 is intended for the present invention. Further, although the design 32 is preferably a multi-color design, this need not be exclusive of other designs. Again, no limitation is intended, and the design 32 can, in fact, be merely a black and white visual presentation or be composed of various shades of gray.

Thus far, the embodiments shown for device 10 have been flat elongated structures which have substantially rectangular cross sections. The present invention, however, also contemplates support structures 12 which have other cross sectional shapes, such as squares, ovals or circles. For example the embodiment of device 10 shown in FIG. 4 has a substantially cylindrical cross section. For a support structure 12c having a substantially cylindrical cross section, as shown in FIG. 4, the irregularities 26 in the gripper 28 can include either radially oriented rings 26c or longitudinally oriented grooves 26c'. In any case, for all embodiments of the device 10, the function of the irregularities 26 is primarily the same, namely to provide structure which presents variations and edges that will establish a gripping or mating interface between the support structure 12 and the food product 14.

The construction of the device 10 will, perhaps, be best appreciated by reference to FIG. 5 wherein it can be seen that the device 10 also includes a protective layer 36. Specifically, the protective layer 36 is a thin layer of plastic which is approximately twelve and one half thousandths of an inch thick (12.5 mil), and which is attached to the support structure 12 with the design 32 positioned between the support structure 12 and the protective layer 36. As intended for the present invention, the protective layer 36 is made of a bio-compatible material, and it provides a smooth finish for the surfaces 16 and 18. Additionally, as best seen in FIG. 5, the thickness 38 of the support structure 12 (embodiments shown in FIGS. 1, 2 and 3) is approximately forty thousandths of an inch (40 mil). For all embodiments, the support structure 12 is preferably made of styreen.

In the manufacture of the present invention, it is intended that individual devices 10 be die cut from a sheet 40, such as shown in FIG. 6. Specifically, a plurality of designs 32 are process printed onto the sheet 40. Each of these designs 32 will then eventually correspond to an individual device 10. With the plurality of designs 32 printed onto the sheet 40, the entire sheet 40 is covered with a protective layer 36 which is attached thereto. The actual attachment, or lamination, of the protective layer 36 to the sheet 40 can be accomplished by any means well known in the pertinent art, such as by use of a thermal adhesive. In any case, the design 32 is positioned between the support structure 12 and the protective layer 36. The affixing of designs 32, and the lamination of protective layers 36 can, of course, be done to both sides of the sheet 40 to set up respective surfaces 16 and 18 for the devices 10.

Once the sheet 40 has been prepared, as discussed above, it can be die cut along the lines 42, shown in FIG. 6. By die cutting the sheet 40, a plurality of individual devices 10 are simultaneously created. In order to fully utilize the material of sheet 40, it is possible to cut the sheet 40 into compatibly shaped devices 10. For instance, as shown in FIG. 6, the support structures 12b and 12d are compatible. While the support structure 12b, shown individually in FIG. 3, has indentations 26b, the compatible support structure 12d has protrusion 26d. Other compatible combinations of support structures 12 are possible.

While the particular food product handle as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A device for holding a food product which comprises:
    a support structure having a substantially smooth surface, said support structure being formed with an irregularity for gripping the food product;
    a multi-color design affixed to said surface over the entire surface; and
    a protective layer attached to said support structure with said multi-color design positioned between said support structure and said protective layer.

2. A device as recited in claim 1 wherein said support structure is elongated and is substantially flat to define a first said surface and a second said surface with an edge defined therebetween, with said design being affixed to said first surface and said second surface.

3. A device as recited in claim 2 wherein said irregularity is a hole extending through said support structure from said first surface to said second surface.

4. A device as recited in claim 2 wherein said irregularity is a protrusion extending from said first surface.

5. A device as recited in claim 2 wherein said edge is substantially straight and said irregularity is an indentation in said edge.

6. A device as recited in claim 2 wherein said edge is substantially straight and said irregularity is a projection from said edge.

7. A device as recited in claim 1 wherein said support structure is elongated and is substantially cylindrical in shape.

8. A device as recited in claim 7 wherein said surface is formed with a radially oriented ring shaped depression to establish said irregularity.

9. A device as recited in claim 7 wherein said surface is formed with a longitudinally oriented groove to establish said irregularity.

10. A device as recited in claim 1 wherein said support structure is made of a styrene.

11. A device as recited in claim 1 wherein said protective layer is tinted.

12. A device as recited in claim 1 wherein said multi-color design is composed of colored inks applied to said surface of said support structure by a four color process.

13. A device as recited in claim 1 wherein said device is die-cut from a sheet, said sheet comprising:
    a substantially flat substrate for creating a plurality of said support structures;
    a plurality of multi-color designs affixed to said substrate, each said design being located on said surface of a corresponding said support structure; and
    a stratum attached to said substrate to position said plurality of multi-color designs between said stratum and said substrate.

14. A device for holding a frozen food product which comprises:
    a handle;
    a gripper attached to said handle, said gripper being formed with at least one irregularity for structurally conforming with the frozen food product to hold the frozen food product on said handle;
    a multi-color design affixed to said gripper and to said handle; and
    a protective layer attached to said gripper and to said handle to position said multi-color design between said protective layer and said handle and between said protective layer and said gripper.

15. A device as recited in claim 14 wherein said handle and said gripper define a support structure, and wherein said support structure is elongated and is substantially flat to define a substantially smooth first surface and a substantially smooth second surface with an edge defined therebetween with said design being affixed to said first surface and to said second surface.

16. A device as recited in claim 15 wherein said irregularity is a hole extending through said support structure from said first surface to said second surface.

17. A device as recited in claim 15 wherein said irregularity is a protrusion extending from said first surface.

18. A device as recited in claim 15 wherein said edge is substantially straight and said irregularity is an indentation in said edge.

19. A device as recited in claim 15 wherein said edge is substantially straight and said irregularity is a projection from said edge.

20. A device as recited in claim 14 wherein said multi-color design is composed of colored inks applied to said gripper and said handle by a four color process.

* * * * *